United States Patent [19]

Abrams

[11] 4,068,045
[45] Jan. 10, 1978

[54] FUSED SALT THERMAL DEVICE

[76] Inventor: Howard Abrams, 18701 S. Park Blvd., Shaker Heights, Ohio 44122

[21] Appl. No.: 738,454

[22] Filed: Nov. 3, 1976

[51] Int. Cl.$^2$ .......................................... H01M 6/36
[52] U.S. Cl. ...................................... 429/81; 429/103; 429/112
[58] Field of Search ................ 429/81, 103, 101, 102, 429/112

[56] References Cited

U.S. PATENT DOCUMENTS

| 1,499,901 | 7/1924 | Anderson | 429/81 |
| 2,081,926 | 6/1937 | Gyuris | 429/112 |
| 3,811,943 | 5/1974 | Minck et al. | 429/81 |

FOREIGN PATENT DOCUMENTS

| 20,843 of | 1895 | United Kingdom | 429/103 |

Primary Examiner—Donald L. Walton

[57] ABSTRACT

A fused salt thermal device having two spaced electrodes to provide an active thermal cell space therebetween, a reservoir containing an inorganic fusible salt electrolyte which is solid at a temperature below a predetermined activation temperature and which is molten at or above the activation temperature, and means permitting circulation of the fused salt electrolyte between the active thermal cell space and the reservoir during the generation of electricity in order to replenish spent electrolyte. Preferably, the fused salt thermal device has a metal electrode and an electrically conductive porous electrode spaced therefrom to provide an active thermal cell space with a reservoir containing an inorganic fusible salt electrolyte in fluid communication with the porous electrode so that upon activation of the thermal device the molten salt electrolyte circulates between the active thermal cell space and the reservoir through the porous electrode. A cell is also provided with a carbon cathode, preferably carbon cloth, a magnesium anode and an electrolyte comprising chromic nitrate $(Cr(NO_3)_3 \cdot 9H_2O)$.

6 Claims, 2 Drawing Figures

FUSED SALT THERMAL DEVICE

BACKGROUND OF INVENTION

This invention relates to a fused salt thermal device which is capable of generating electricity.

As is well known in the art of thermal devices, an inorganic fusible salt electrolyte disposed between two electrodes will not be capable of generating any electricity if the temperature of the salt electrolyte is below its activation temperature. Upon reception of sufficient thermal energy to raise the temperature of the salt electrolyte to its activation temperature where the salt becomes molten or fused, the fused salt electrolyte becomes a good ionic conductor permitting the thermal cell to generate electricity in a closed system without addition of further electrolyte. Such thermal devices remain active and generate electricity only while the electrolyte is at or above its activation temperature. The inorganic fusible salt electrolyte has an activation temperature which is usually, but not necessarily, the temperature at which the salt becomes a liquid or fuses. As long as the electrolyte remains at or above its activation temperature, the thermal device will generate electricity.

Since the activation temperature of the electrolyte is generally the melting point of the fusible salt electrolyte, a considerable degree of latitude is permitted in selecting a cell activation point by choosing a fusible salt electrolyte which has a melting point above the ambient temperature of the surroundings udring the inactive state. The fused salt electrolyte is also selected in accordance with the temperature and the intensity of the thermal energy available to activate the cell. Thus, depending on the materials selected for the electrodes, the cell design, and the intended use of the cell, an inorganic fusible salt electrolyte may be selected to achieve a desired activation temperature.

With reference to sources of electric current, the word "cell" usually applies to a single element comprising a pair of electrodes and an electrolyte that interact to produce electricity. Generally, the term "battery" contemplates an assembly of two or more such cells. In voltaic cells the positive electrode is termed the cathode while the negative electrode is termed the anode; conversely, in electrolysis cells and secondary cells or batteries, the terminology is reversed. For the sake of consistency throughout this specification the terminology of a voltaic cell will be used, where the negative electrode is the anode and the positive electrode is the cathode.

Generally, the inorganic fusible salt electrolyte employed in thermal devices is hygroscopic or delinquescent such that fabrication of the thermal device requires an atmosphere where the humidity and moisture are controlled. Also, a cell employing such an electrolyte must seal the electrolyte from contact with the ambient surroundings so that the electrolyte does not absorb moisture which deteriorates the effect of the fused salt electrolyte.

Another problem encountered in the operation of fused salt thermal devices is the conflict between attempting to locate the positive and negative electrodes as close together as possible in order to maximize current output while also maximizing the amount of electrolyte in order to accommodate deterioration and degeneration of the electrolyte and to provide maximum output life without additional thermal energy from an external source. These conflicting objectives are further compounded in the construction of a thermal cell or battery where the electrolyte for each cell has heretofore been contained totally between the two electrodes. See, for example, U.S. Pat. Nos. 3,719,527 and 3,575,714. Heat fusible salt thermal reservoirs are known in thermal cells, but the salt of the reservoir is a separate entity from the electrolyte. U.S. Pat. Nos. 3,899,353 and 3,677,822. In electrochemical fuel cells, electrolyte reservoirs are known for providing additional electrolyte for circulation through the electrodes into a narrow active cell space with a decreased internal resistance (U.S. Pat. No. 3,769,090), but the circulating electrolyte is employed to remove heat rather than contain it as desired in thermal cells and to accommodate the generation of gases which cause the problem of bubble pressure not encountered in thermal cells.

Another problem encountered in fused salt thermal devices is that suitable inorganic fusible salt electrolytes are generally very strong corrosive and oxidizing agents, and therefore, care must be taken in constructing the cell and handling the fused electrolyte. The oxidizing effect of inorganic fusible salt electrolytes can also adversely affect the electrical output of the thermal device.

With regard to materials, fused salt thermal cells having magnesium and carbon electrodes are standard and well known in the thermal cell field as shown by U.S. Pat. No. 2,291,739 and by Goodrich, Robert B., et al, "Thermal Batteries," *Journal of the Electrochemical Society*, Volume 99, No. 8, page 207C, August, 1952. It is known that the carbon electrode may be porous carbon or a carbon cloth, as exemplified by U.S. Pat. No. 3,573,986. Although the usual electrolyte in thermal cells is some type of halide salt such as sodium chloride, various nitrate electrolytes are known, particularly for their advantage in providing a low melting point electrolyte. *"High-Energy Batteries,"* Jasinski, Raymond, Plenum Press, New York, 1967. Specific nitrates that are known and disclosed in the art are lithium nitrate, sodium nitrate, potassium nitrate, and silver nitrate. U.S. Pat. Nos. 1,406,352, 3,575,714, and 3,719,527. However these electrolytes are more corrosive, are stronger oxidizing agents, and have higher melting points than chromic nitrate which has heretofore, insofar as the present inventor is aware, not been known or used in the thermal cell field. Furthermore, chromic nitrate as used in combination with carbon, preferably carbon cloth, and magnesium electrodes is not known insofar as the present inventor is aware and has additional advantages that will be described in more detail below.

OBJECTS OF THE INVENTION

In view of the foregoing, it is an object of the present invention to minimize the active thermal cell space between the electrodes of a thermal device while providing sufficient electrolyte to accommodate the effects of electrolyte degeneration and deterioration and to maximize electrical power output. Another object exists in providing a cell structure which permits circulation of the electrolyte from a reservoir to the active thermal cell space.

It is another object of the present invention to provide a simple and compact thermal device which is relatively easy to construct and which adequately seals the hygroscopic fused salt electrolyte from ambient surroundings.

It is still a further object of the present invention to provide a thermal device having electrodes and electrolyte of a suitable composition which tends to minimize the corrosive and oxidizing effects of the electrolyte.

These and other objects will become apparent after reading the following summary and description of the present invention.

SUMMARY OF INVENTION

These and other objects may be accomplished by a fused salt thermal device having two spaced electrodes to provide an active thermal cell space therebetween, a reservoir containing an inorganic fusible salt electrolyte which is a solid at a temperature below a predetermined activation temperature and which is molten at or above the activation temperature, and means permitting circulation of the electrolyte when the cell is activated between the active thermal cell space and the reservoir during the generation of electricity in order to replenish the electrolyte. Preferably, the fused salt thermal device has a metal electrode and an electrically conductive porous electrode spaced from the metal electrode to define the active thermal cell space. A reservoir is provided in fluid communication with the electrically conductive porous electrode so that the inorganic fusible salt electrolyte disposed within the reservoir is able to circulate between the active thermal cell space and the reservoir through the porous electrode during the generation of electricity in order to replenish the electrolyte. Electrolyte circulation is achieved when the electrolyte is provided with sufficient thermal energy to raise the temperature of the electrolyte to its activation temperature where the electrolyte becomes molten or fused.

The fused salt thermal device of the present invention also contemplates a preferred embodiment of cell design in which (a) a separator plate is provided between the metal electrode and the electrically conductive, flexible porous electrode; (b) a spacer frame is provided with an opening therethrough which houses and encompasses the reservoir located behind the porous electrode; (c) a tensioning frame such as a hoop is used to maintain the porous electrode under tension, the tensioning member frictionally interfitting within the opening of the spacer frame; and (d) sealing means are provided on both major surfaces of the spacer frame to seal the electrolyte between two metal plates, one of which is the metal electrode and the other of which is a current collector plate in electrical contact with a flange on the outer periphery of the porous electrode.

The present invention also contemplates a thermal device composed of a carbon cathode and a magnesium anode with a chromic nitrate fused salt electrolyte ($Cr(NO_3)_3 \cdot 9H_2O$). Such a thermal device provides excellent electrical output while employing electrode materials and an electrolyte which tend to minimize the oxidizing and corrosive effects of the fused salt electrolyte.

The present invention also contemplates a thermal battery composed of the thermal cell of the present invention, the thermal cell being constructed in such a fashion that the two major outer surfaces of the thermal cell are flat metallic plates which can make surface to surface contact with an adjacent thermal cell. Such a thermal battery may be constructed with a multiple of cells in series or parallel.

DESCRIPTION OF DRAWINGS

A preferred embodiment of the present invention will be described with reference to the accompanying drawings in which.

DETAILED DESCRIPTION

Figure 1:
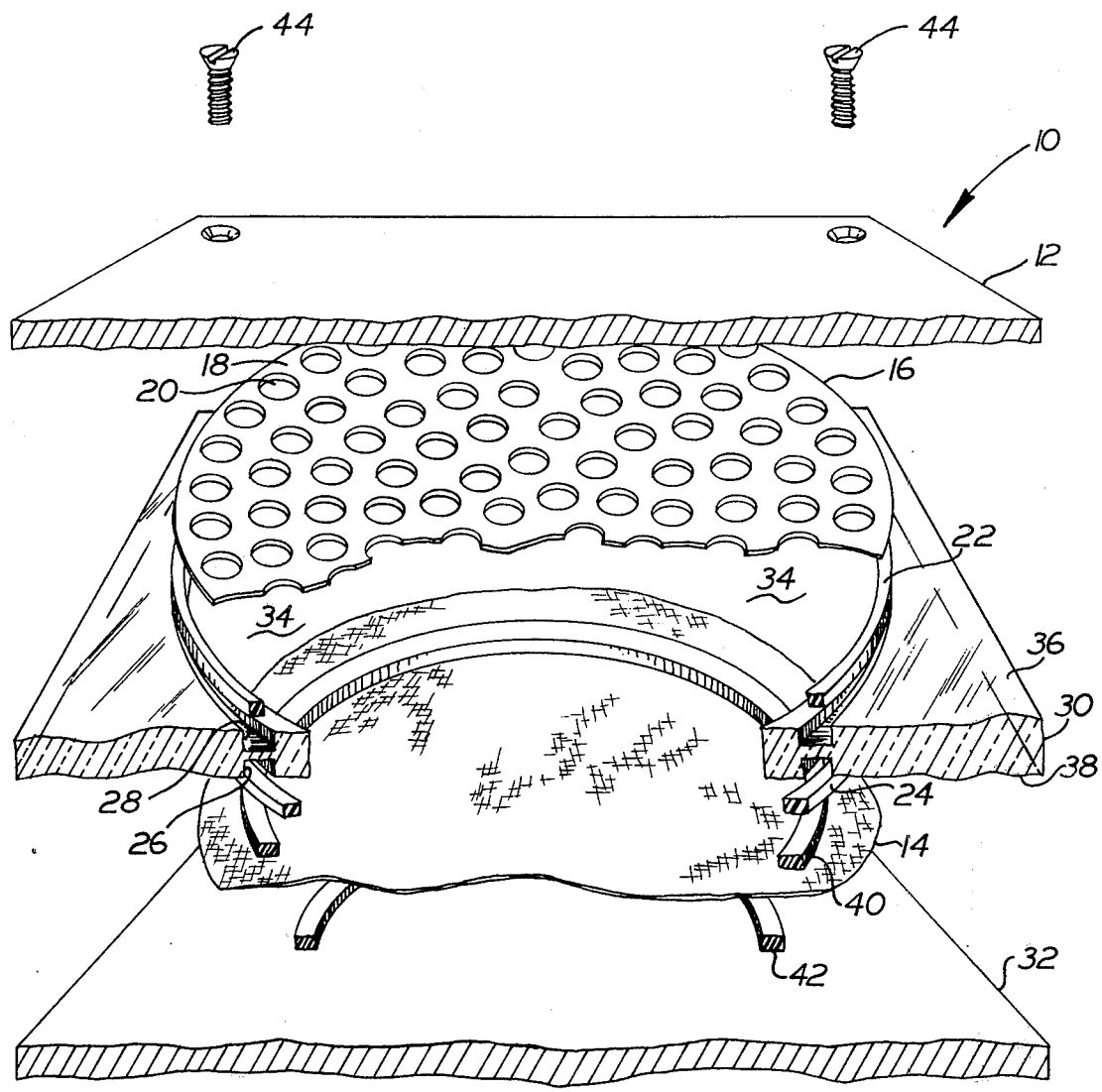
FIG. 1 is an exploded three-dimensional pictorial view partly in cross section along the front side thereof, the cross section being a stepwise cross section ascending from the bottom of the figure.

With reference to FIG. 1, the thermal device 10 shown therein has metal electrode 12 and electrically conductive porous electrode 14 spaced therefrom which are the electrodes that form the thermal cell and which define an active thermal cell space therebetween. Because the porous electrode 14 can be constructed of a flexible material, a separator 16 is inserted between the metal electrode 12 and the porous electrode 14 in order to keep electrodes 12 and 14 from contacting each other and shorting out the cell and to maintain them equidistant. Because separator 16 may contact both the metal electrode 12 and porous electrode 14 in the construction shown in FIGS. 1 and 2, separator 16 must of course be electrically nonconductive. Separator 16 must also be heat resistant to the temperatures encountered within the thermal cell and be corrosive resistant and otherwise resistant to the inorganic fused salt electrolyte. An example of a suitable separator material which would meet the above criteria for most thermal cells is polytetrafluoroethylene. Separator 16 can be of any suitable porous structure so long as the body 18 of separator 16 separates the metal electrode 12 and the porous electrode 14, while on the other hand the openings 20 permit the maximum possible area exposed for electricity generation.

Metal electrode 12 forms one generally planar, major side of the thermal cell 10 while current collector plate 32 forms the other generally planar major surface of the thermal cell 10. Located between metal electrode 12 and current collector plate 32 is spacer frame 30, which is also constructed of a material which is electrically nonconductive, resistant to heat and inert towards the fused salt electrolyte. A suitable type of material for spacer plate or frame 30 would be a plastic such as polymethylmethacrylate.

Spacer frame 30 is provided with an opening 34 therethrough, flexible porous electrode 14 and metal electrode 12 being spaced from one another to provide an active cell space therebetween and being jointly located at one end of opening 34. The active cell space and the molten electrolyte contained therein during cell operation are sealed from the ambient surroundings by a sealing ring 22 contained within groove 28 of spacer frame 30 in major surface area 36. In the particular embodiment shown in FIG. 1, the opening 34 in spacer frame 30 is circular, and therefore, the groove 28 is circular to correspond thereto and to interfit with circular sealing ring 22. Naturally the sealing ring 22 must be resistant to heat and to the corrosive and oxidizing effects of the electrolyte. A suitable material for sealing ring 22 is sold under the trademark Viton which is a trademark of E. I. duPont de Nemours & Co. for a series of fluoroelastomers based on the copolymer of vinylidene fluoride and hexafluoropropylene. The seal means 22 and 28 described with reference to major surface area 36 of spacing frame 30 has a corresponding sealing ring 24 which interfits with groove 26 in the other major side 38 of spacer frame 30. Sealing ring 24 maintains a seal between spacer frame 30 and current collector plate 32.

Porous electrode 14 is maintained under tension by means of interfitting hoops 40 and 42 which coact much like embroidery hoops and will be described in more detail in connection with FIG. 2.

When the thermal cell 10 of FIG. 1 is properly assembled, metal electrode 12 and current collector plate 32 serve as the two outside major surfaces of the cell. Each of metal electrode 12 and current collector plate 32 is held in sealing engagement against respective sealing rings 22 and 24 by means of screws 44, only two of which are illustrated, it being recognized that generally more screws will be required depending on the size and structure of the cell and its elements.

Figure 2:
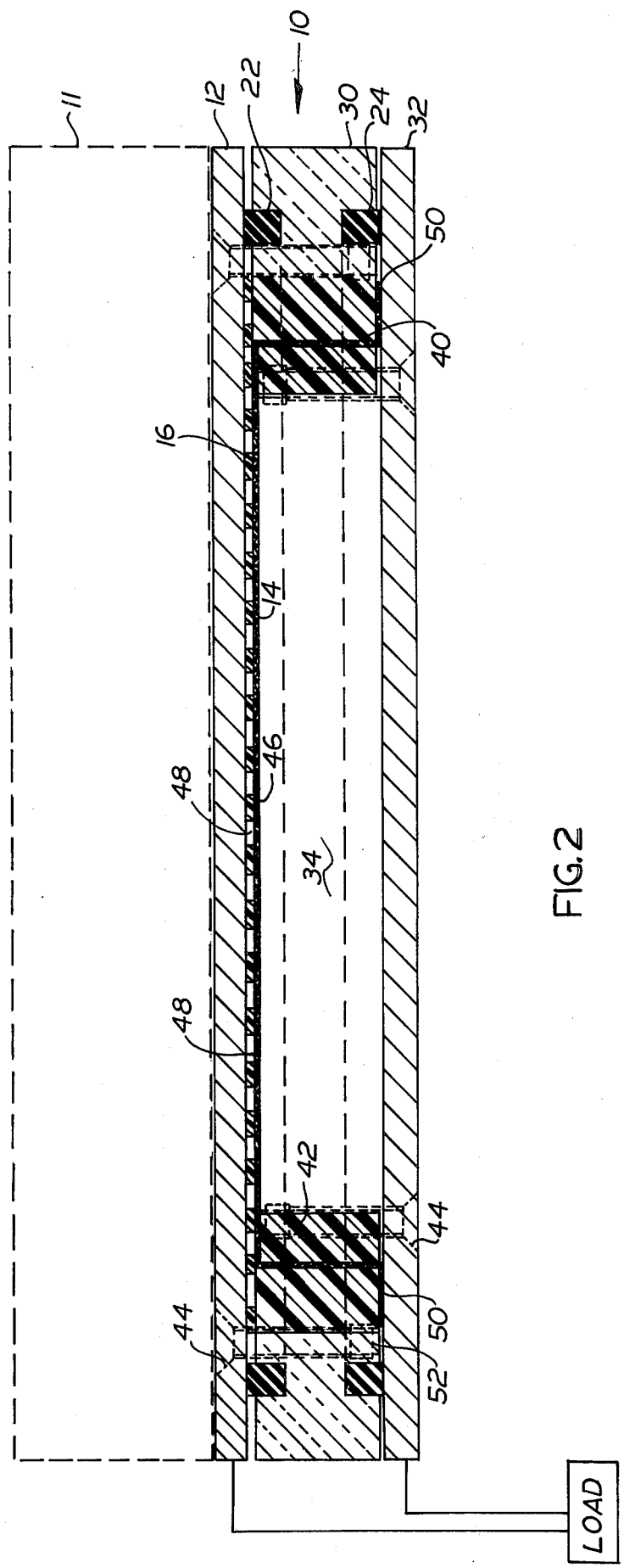
FIG. 2 is a lateral cross section through the center line of the cell shown in FIG. 1 as assembled with an additional mating cell shown in phantom.

FIG. 2 shows a lateral cross section of the cell of FIG. 1 in its assembled condition, the cross section being taken through the center line of the cell; the shape of the porous electrode 14 will become readily apparent when FIG. 2 is taken in conjunction with FIG. 1. Porous electrode 14 is a flexible material corresponding in its outer shape to the shape of opening 34 and spacer frame 30. Since the opening 34 of spacer frame 30 is circular, porous electrode 14 will also be circular although of a greater diameter. The porous electrode 14 has a major, generally planar surface area 46 which is spaced oppositely from metal electrode 12 by separator 16. In that space is located the active thermal cell space designated by the numeral 48. The interfitting retaining hoops 40 and 42 interfit much like embroidery hoops in order to maintain the generally planar major surface area 46 of porous electrode 14 under tension and generally flat so that it is biased against separator plate 16 to maintain the porous electrode 14 equidistant from electrode 12. Because of the interfitting hoops 40 and 42, the porous electrode 14 becomes disc shaped, and sufficient material is employed for the porous electrode 14 in order to provide a circular flange 50 around the outer periphery of porous electrode 14. Naturally, the interfitting hoops 40 and 42 must also be made of a heat and oxidation resistant material.

The interfitting hoops 40 and 42 maintain the porous electrode 14 under tension by reason of a frictional fit between the hoops such that the porous electrode 14 and the hoops may be separately handled as a unit. The assembly of the hoops 40 and 42 and the porous electrode frictionally interfits with spacer frame 30 into opening 34 therein.

The flange 50 of the porous electrode 14 is provided for electrical contact with current collector plate 32. The contact between the porous electrode 14 at flange 50 and the current collector plate 32 is assured by means of a mechanical clamping pressure therebetween through the use of screws 44, which are shown in phantom in FIG. 2. The screws or other suitable mechanical means also provide a sealing connection between sealing rings 22 and 24 and metal electrode 12 and current collector plate 32, respectively. A suitable means for providing the electrical and sealing contact for the cell of FIG. 2 is to embed a nut 52 within spacer frame 30 to engage each screw 44. In this manner either electrode 12 or current collector plate 32 may be removed without disassembling the entire cell 10. The screws 44 or other suitable cell connecting means is provided so that it will be flush with outer surface of electrode 12 and current collector plate 32 so that cell 10 can be placed in electrical engagement with another similar cell 11 to form a thermal battery. Any number of these cells may be so aligned in series or parallel to create a thermal battery.

With the construction of the particular cell shown in FIG. 1 and FIG. 2, the opening 34 in spacer frame 30 acts as a reservoir for the fused salt electrolyte since it is located between the porous electrode 14 and current collector plate 32 which are at the same electrical potential in view of the contact therebetween at flange 50. The fused salt contained within reservoir 34 during activation of the thermal cell 10 is then able to circulate through the porous electrode 14 into the active thermal cell space 48. In this manner, metal electrode 12, and oppositely spaced porous electrode 14 are thereby closely spaced in order to maximize current output and efficiency. The reservoir 34 is then able to supply electrolyte for circulation in order to replenish spent electrolyte during the generation of electricity. Therefore, the advantage of closely spaced electrodes together with a large quantity of electrolyte is achieved. Circulation of the electrolyte is achieved by the tendency toward chemical and/or thermal equilibrium between the electrolyte in the reservoir and the active thermal cell space.

The materials employed for the metal electrode 12, porous electrode 14 and the electrolyte may be of any suitable material as described in the references discussed in the background section of the present specification as well as other materials which are known and have been used in the thermal cell art. Thus, the anode can be lithium, magnesium or calcium, for example; the cathode can be carbon, silver, copper or nickel, for example; the electrolyte can be chromic nitrate and various alkali or alkaline earth chlorides, bromides, nitrates, sulfates and carbonates, for example. In addition to the type of electrode materials which are well known in the thermal cell art, the structure of porous electrode 14 may take on any of a number of suitable shapes or characteristics such as flexible conductive cloth or metallic screen. The current collector plate 32 must of course be corrosion resistant in view of its contact with the molten electrolyte in the reservoir in opening 34 and must also be a good electrical conductor, such as aluminum, in order to serve its purpose as a current collector plate from porous electrode 14.

It has also been discovered that a thermal cell composed of a positive electrode or cathode comprising carbon, a negative electrode or anode comprising magnesium, and an electrolyte comprising chromic nitrate $(Cr(NO_3)_3 \cdot 9H_2O)$ has advantages over prior art thermal cells. Such a chromic nitrate electrolyte has a melting point of about 60° C which provides a relatively low activation point for a thermal cell which enlarges the potential uses for such a cell. The chromic nitrate electrolyte in conjunction with the carbon cathode and magnesium anode has the advantage of minimizing corrosive and oxidizing problems which can occur in thermal cells. Such a thermal cell also has the advantage of employing materials which are relatively easy to handle and obtain while achieving a good level of electrical output. Preferably, the magnesium anode may comprise 0–10% aluminum, 0–1% zinc and 89–100% magnesium; two magnesium anodes which have been employed are 9% aluminum, 1% zinc and 90% magnesium and 3% aluminum, 1% zinc and 96% magnesium. The carbon cathode can be of any suitable composition or shape, such as porous carbon cloth. The electrolyte is primarily composed of the above described chromic nitrate but may also include depolarizers, other suitable additives, and other electrolytes in combination therewith. Preferably, the electrolyte contains chromic nitrate as the major component, that is, more than 50% by weight.

A further advantage of a thermal cell constructed of carbon, magnesium and chromic nitrate is that the original current output can be restored if the current level has been reduced by merely applying a reverse direct current charge to the thermal cell, although a scientific explanation therefore has not been as yet determined. While not wishing to be bound by any particular scientific explanation, it is believed that discharge of the thermal cell of the present invention may involve reduction of chromium of valence three to chromium of valence two at the magnesium negative electrode or anode. It is also possible that oxidation of the nitrate ion may be involved. It is therefore believed that the thermal cell may be restored to its original current level by regenerating the electrolyte with a direct current to oxidize the chromium existing in valence two to chromium existing in the original valence of three.

An example of a thermal cell in accordance with the foregoing invention having the overall dimensions of 6 by 6 by 13/16 inches was constructed and tested as follows. The current collector plate 32 was an aluminum plate approximately ⅛ inch thick, the thickness being selected in order to achieve a uniform sealing pressure. The magnesium plate 12 was approximately 7/32 inch in thickness and composed of 9% aluminum, 1% zinc and 90% magnesium. The spacer frame 30 was formed of polymethylmethacrylate while the sealing members 22 and 24 were formed of Viton. The opening 34 in the spacer frame 30 was approximately 5 inches in diameter; the porous electrode 14 was a woven carbon cloth having a circular exposed major surface 46 of approximately 4½ inches in diameter. The hoop retaining means 40 and 42 and the separator 16 were formed of polytetrafluoroethylene. The above described chromic nitrate electrolyte was melted and poured into the reservoir in opening 34 of the cell in order to entirely fill any spaces. After the cell was assembled and clamped together by screws 44, the cell was allowed to deactivate by permitting the electrolyte to cool below its melting point of 60° C. Upon activation by the applicaiton of thermal energy to bring the chromic nitrate electrolyte up to its activation point, the cell was able to achieve a voltage output of about approximately 1.5 volts and a current output of approximately 150 milliamps over a 2-3 week period while the cell was activated by the continuous application of thermal energy through use of a hot plate.

What is claimed is:

1. A fused salt thermal device comprising:
a first electrode;
an electrically conductive porous electrode spaced from said first electrode to define an active thermal cell space therebetween, said porous electrode comprising a flexible material maintained under tension by a retainer near the periphery thereof;
a reservoir in fluid communication with said active thermal cell space through said porous electrode; and
an inorganic fusible salt electrolyte disposed within said reservoir and being solid at a temperature below a predetermined activation temperature and being molten at or above said activation temperature where said molten salt circulates between said active thermal cell space and said reservoir through said porous electrode during the generation of electricity in order to replenish electrolyte.

2. A fused salt thermal device as claimed in claim 1 including an inert separator between said first electrode and said porous electrode.

3. A fused salt thermal device as claimed in claim 2 wherein said first electrode comprises a generally planar metallic material having a major surface area thereof as the electrode surface area bounding the active thermal cell space on one side thereof, said electrically conductive porous electrode also being generally planar and having a major surface area thereof closely spaced from the first electrode by a distance approximately equal to thickness of the inert separator therebetween.

4. A fused salt thermal device as claimed in claim 1 wherein a current collector is in electrical communication with said porous electrode to transmit and receive electrical current therefrom.

5. A fused salt thermal device as claimed in claim 1 wherein said first electrode comprises magnesium, said porous electrode comprises carbon, and said electrolyte comprises chromic nitrate.

6. A fused salt thermal device comprising:
a cell frame having an opening therethrough and a groove in each of a first and second major surface thereof;
sealing means in each of said grooves in said cell frame;
a flexible electrically conductive porous electrode;
tensioning means interfitted in the opening in said cell frame and securing said porous electrode with a major surface portion thereof in a generally planar position parallel to the first major surface of said cell frame and a flange portion thereof being generally parallel to the second major surface of said cell frame;
a current collector plate in electrical contact with the flange of said porous electrode and with the sealing means on the second major surface of said cell frame;
a metal electrode in sealing contact with the sealing means on the first major surface of said cell frame and spaced from said porous electrode to form an active thermal cell space;
an inert separator between said metal electrode and the generally planar major surface portion of said porous electrode;
a reservoir located within said cell frame in fluid communication with the active thermal cell space; and
an inorganic fusible salt electrolyte being disposed within said reservoir and being solid at a temperature below a predetermined activation temperature and being molten at or above said activation temperature where said molten salt circulates between said active thermal cell space and said reservoir through said porous electrode during the generation of electricity in order to replenish electrolyte.

* * * * *